United States Patent [19]
Kirker

[11] Patent Number: 5,813,518
[45] Date of Patent: Sep. 29, 1998

[54] CONVEYOR SYSTEM

[75] Inventor: Eric John Kirker, Vandalia, Ohio

[73] Assignee: Odawara Automation, Inc., Tipp City, Ohio

[21] Appl. No.: 642,609

[22] Filed: May 3, 1996

[51] Int. Cl.⁶ .................................................. B65G 15/10
[52] U.S. Cl. ............................................................ 198/817
[58] Field of Search ....................................... 198/817, 831

[56] References Cited

U.S. PATENT DOCUMENTS

| | | | |
|---|---|---|---|
| 3,325,977 | 6/1967 | Kirsten | 198/817 |
| 3,620,139 | 11/1971 | Kulwicki | 198/817 |
| 4,422,541 | 12/1983 | Lisec | 198/817 |
| 5,127,514 | 7/1992 | Guttinger et al. | 198/803 |
| 5,145,053 | 9/1992 | Krieger et al. | 198/817 |
| 5,184,898 | 2/1993 | Kito | 384/43 |
| 5,226,524 | 7/1993 | Guttinger et al. | 198/343 |
| 5,244,282 | 9/1993 | Imai et al. | 384/43 |
| 5,259,495 | 11/1993 | Douglas | 198/817 |
| 5,322,160 | 6/1994 | Markiewicz et al. | 198/836 |

FOREIGN PATENT DOCUMENTS

| | | | |
|---|---|---|---|
| 2544292 | 4/1983 | France . | |
| 2663011 | 12/1991 | France | 198/817 |
| 64-13323 | 1/1989 | Japan . | |
| 6227635 | 8/1994 | Japan . | |

*Primary Examiner*—Joseph E. Valenza
*Attorney, Agent, or Firm*—Thompson Hine & Flory LLP

[57] ABSTRACT

A conveyor system in which the lateral distance between the parallel conveyor belts can be easily adjusted includes two parallel guide-rails for guiding the two endless parallel belts riding in the guide-rails. One guide rail is mounted to a plurality of fixed supports, while the other guide rail is mounted to a plurality of laterally mobile supports. Each of the mobile supports include a pinion gear rotatably mounted thereto, where each pinion gear is engaged with a laterally fixed rack mounted on a standing assembly. The pinion gears are also coupled together such that they rotate in unison, thereby guaranteeing that each of the mobile support columns translate laterally in unison.

16 Claims, 4 Drawing Sheets

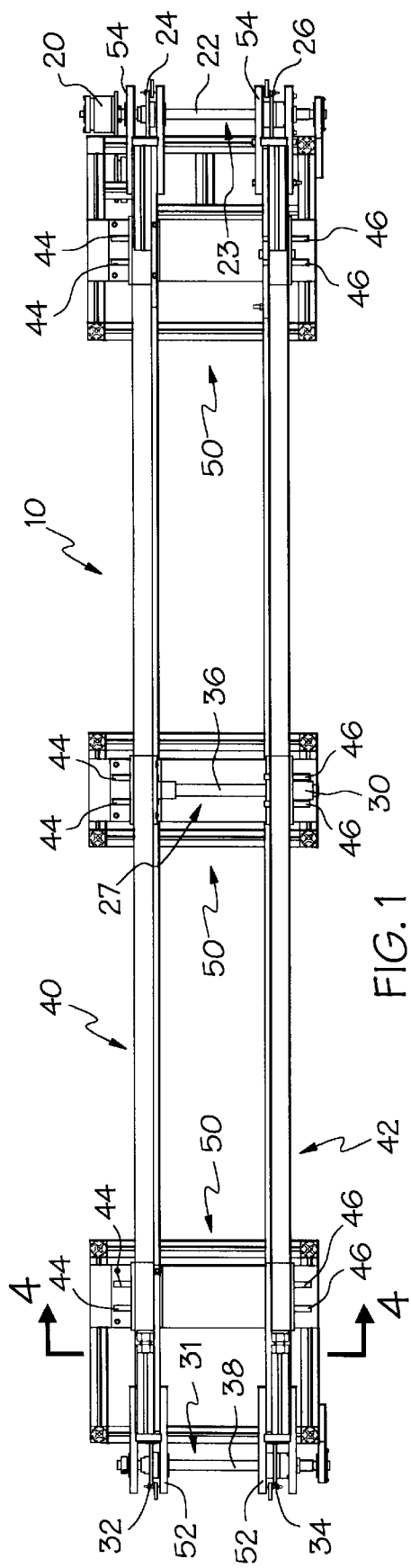
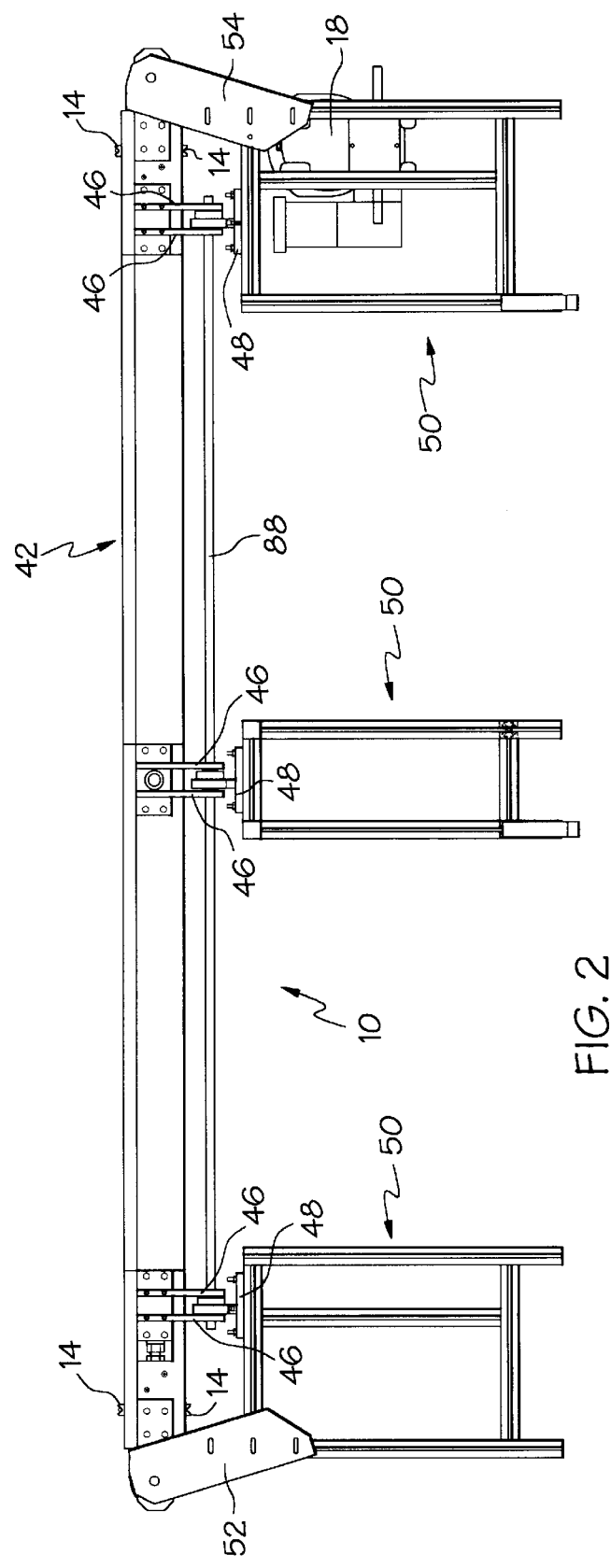
FIG. 1
FIG. 2

CONVEYOR SYSTEM

BACKGROUND

The present invention relates to a conveyor system and, more particularly, to a dual-belt conveyor system in which the spacing between the parallel belts is adjustable.

Prior art conveyor systems having adjustable width parallel belts, typically consist of two parallel guide-rails for guiding and supporting the endless parallel belts or chains. One guide-rail is a fixed guide-rail, while the other guide-rail is a laterally mobile guide-rail. The chains are driven by sprocket wheels coupled to a drive shaft extending between the guide-rails, where one of the sprocket wheels will be laterally fixed to the drive shaft and the other sprocket wheel will be laterally slidable along the drive-shaft.

Lateral adjustment of these prior art conveyor systems typically involves rotating a threaded shaft extending between the guide rails of the conveyor system where the threads of the shaft are engaged with the threads of a bore extending through the laterally mobile guide-rail, and where the shaft is rotatably coupled to the laterally fixed guide-rail. The shaft is driven via a hand crank or by motorized means. Rotation of the shaft in one direction causes the distance between the two guide rails to narrow, while rotation of the shaft in the opposite direction causes the distance between the guide rails to increase.

A disadvantage with this type of adjustment, is that the threaded shaft will be positioned longitudinally in one spot along the conveyor. Therefore, the widening and narrowing forces exerted by rotation of the shaft will not be evenly distributed along the length of the laterally mobile guide rail. Because of this uneven distribution of the forces, and also because of slight bending, drooping, or twisting of the guide rails, some of the lateral bearings will bind on their respective lateral guide shafts during lateral movement, especially those farthest away from the longitudinal position of the threaded shaft. This binding of the bearings on the guide shafts makes it extremely difficult to adjust the distance between the parallel guide rails.

One attempt to correct this problem has been to provide several threaded shafts longitudinally dispersed along the conveyor system, where the shafts are all simultaneously rotated through use of a complex and bulky gearing system. A disadvantage with this type of system is that the force required to effectuate rotation of all of these threaded shafts in unison usually requires a motorized gearbox. Furthermore, the complexity of this system presents reliability and expense problems.

Accordingly, there exists a need for a conveyor system in which the distance between the parallel belt guide rails can be easily adjusted, without the binding up and locking of the lateral bearings on the lateral guide shafts, and furthermore without the necessity of a complex, expensive and unreliable gearbox system.

SUMMARY

The present invention provides a conveyor system in which the lateral distance between the parallel belts can be easily adjusted, without any binding or locking up of lateral bearings on lateral guide shafts, and without the necessity of a complex gearbox or a motor driven mechanism for assisting such adjustment.

The present invention comprises two parallel guide-rails for guiding two endless parallel belts riding in the guide-rails. The belts longitudinally convey a plurality of workpiece holding buckets fixed to the belts to different workstations along the conveyor system.

A conventional indexing motor and clutch mechanism are used to drive a driver spline shaft. Coupled to this driver spline shaft is a driver cam assembly, including a laterally fixed sprocket wheel and a laterally slidable sprocket wheel. The conveyor system also includes an end cam assembly, having an end spline shaft, a laterally fixed end sprocket wheel and laterally slidable end sprocket wheel. The slidable sprocket wheels are each bolted to a spline nut having bearings for facilitating easy sliding of the mobile sprocket wheels along the spline shafts.

One of the guide rails is mounted to a plurality of laterally fixed support columns, while the other guide rail is mounted to a plurality of lateral mobile support columns. Each of the mobile support columns include a pinion gear rotatably mounted thereon, where each of the pinion gears is engaged with a laterally fixed rack. The pinion gears are all coupled together such that all of the pinion gears rotate in unison, thereby guaranteeing that each of the mobile support columns translate laterally in unison, reducing any chance of binding of the spline nuts on the spline shafts as the mobile guide rail translates laterally back and forth. Preferably the pinion gears are connected together by a shaft extending between, and coupled to the hubs of the pinion gears.

Furthermore, in the preferred embodiment, the mobile guide rail includes sheet metal shrouding and metal support plates to reduce any twisting, drooping or bending of the guide rail. This further reduces any chance of binding of the spline nuts on the spline shafts as the mobile guide rail translates laterally back and forth.

Accordingly, it is an object of the present invention to provide a conveyor system having simple and inexpensive mechanisms to facilitate adjustment of the lateral distance between endless, parallel conveyor belts. It is a further object of the present invention that these adjustment mechanisms substantially prevent binding of the slidable spline nuts along the spline shafts, irrespective of the longitudinal position of the spline nuts along the conveyor system.

Other objects and advantages of the present invention will be apparent from the following description, the accompanying drawings and the appended claims.

BRIEF DESCRIPTION OF THE DRAWINGS

FIG. 1 is a perspective overhead view of the conveyor system of the present invention;

FIG. 2 is a perspective side view of the conveyor system of the present invention;

DETAILED DESCRIPTION

Figure 3:
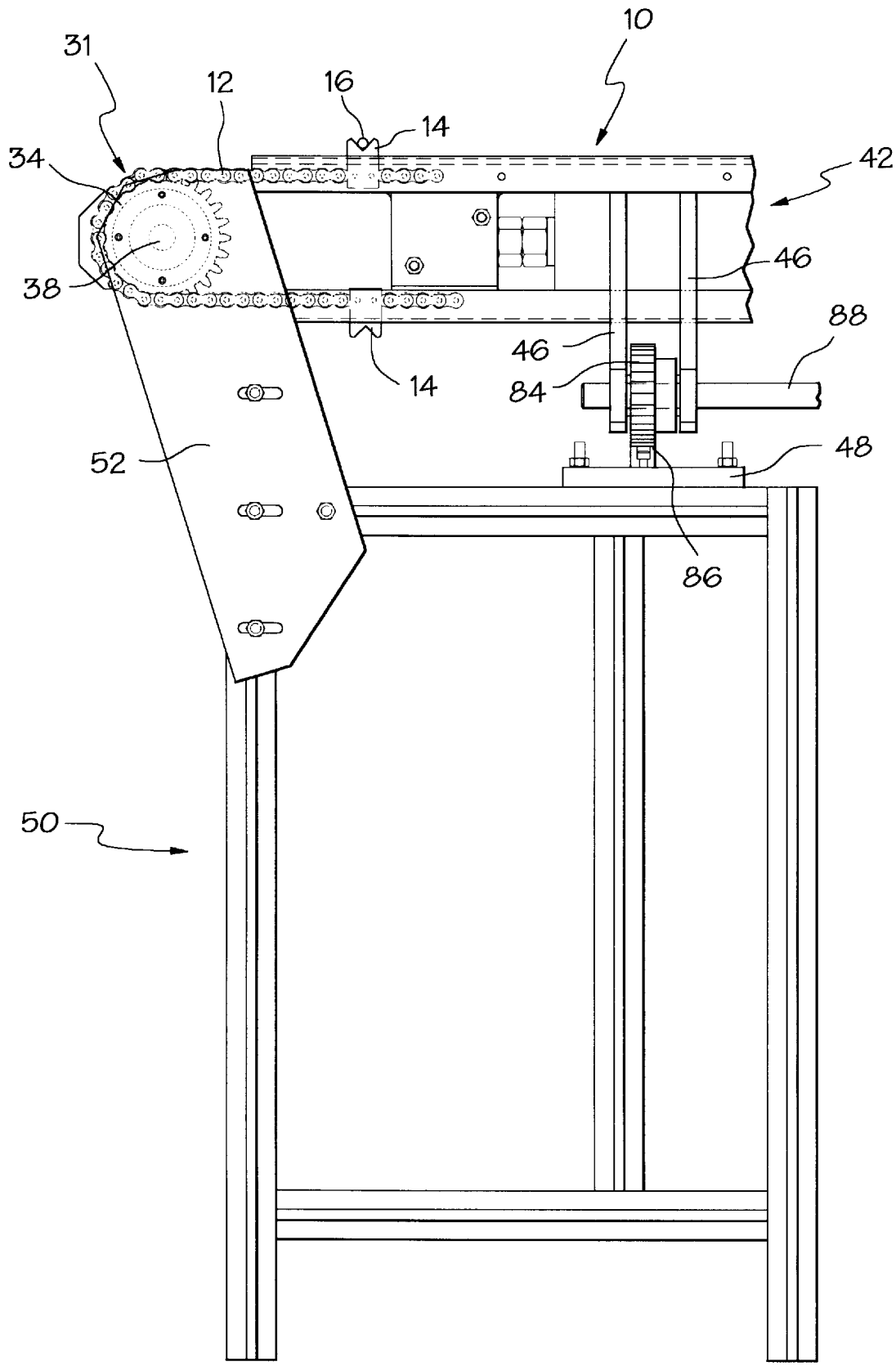
FIG. 3 is a close up, side view of one end of the conveyor system, showing sprocket and conveyor belt mechanisms in phantom.

As shown in FIGS. 1, 2 and 3, the conveyor system 10 of the present invention comprises two endless parallel belts 12. Coupled to the belts 12, are buckets 14 for carrying workpieces 16 longitudinally along the conveyor system 10. The belts 12 are preferably chain-link belts, however it is within the scope of the invention to utilize any conventional, flexible belts capable of translating buckets along the conveyor system.

A conventional indexing motor 18 and clutch mechanism 20 are used to drive a drive shaft 22. Coupled to the drive shaft is a driver cam assembly 23, including a laterally fixed sprocket wheel 24 and a laterally slidable sprocket wheel 26. The conveyor system also includes an end cam assembly 31, having an end sprocket shaft 38, a laterally fixed end sprocket wheel 32 and laterally slidable end sprocket wheel 34. The sprocket wheels 24, 26, 32 and 34 engage with and provide support for the parallel belts 12 of the conveyor system.

An intermediate support assembly 27, having an intermediate guide shaft 36 and a laterally slidable ball bushing 30 is located between the driver cam assembly 23 and the end cam assembly 31. While the present embodiment utilizes one intermediate support assembly 27, the number of intermediate support assemblies will depend upon the length of the conveyor system and the number of intermediate support assemblies (if any) needed to support the conveyor rails and keep them straight.

The conveyor system includes a stationary longitudinal support structure 40 and a laterally mobile longitudinal support structure 42. As will be described in greater detail below, the support structures 40, 42 provide seats for the parallel belts and further facilitate guiding and supporting the belts 12 and buckets 14.

Each stationary support structure 40 is mounted on a plurality of stationary support columns 44, and each mobile support structure 42 is mounted on a plurality of laterally mobile support columns 46. The stationary support columns 44 and mobile support columns 46 are each mounted to platforms 48, which are in turn bolted to a lightweight standing assembly 50. Also coupled to the standing assembly 50, on each end, is a pair of support plates 52 for rotatably supporting the end sprocket shaft 38 therebetween, and a pair of support plates 54 for rotatably supporting the driver sprocket shaft 22 therebetween. The support plates 52, 54 can be removed if the conveyor is conveying lighter workpieces.

Figures 4, 5:
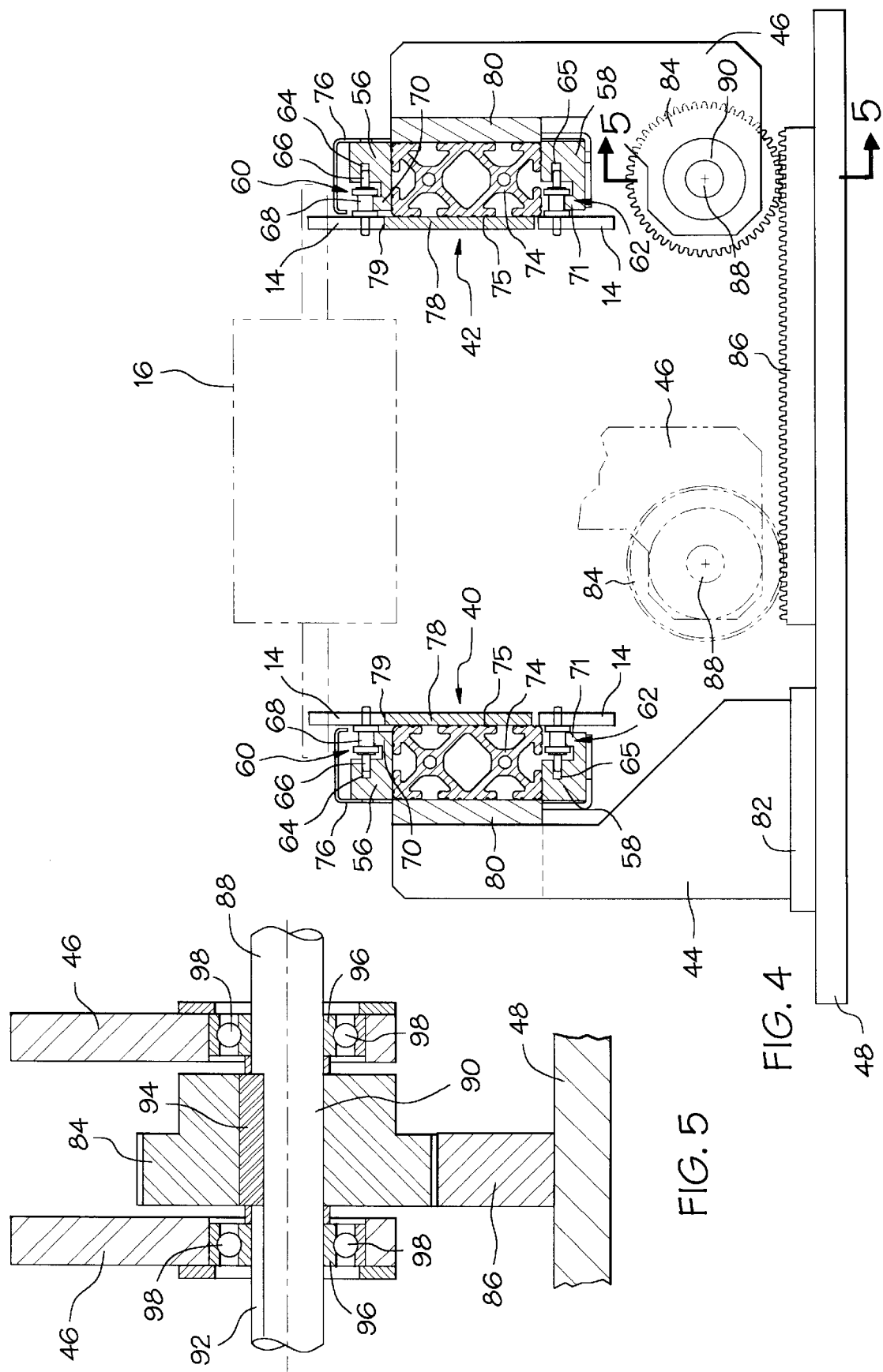
FIG. 4 is a cross-sectional view of the stationary and mobile longitudinal support structures, taken along line 4—4 of FIG. 1.
FIG. 5 is a cross-sectional view of a mobile support column incorporating rack and pinion mechanisms, taken along line 5—5 of FIG. 4.

As shown in FIG. 4, each of the support structures 40, 42 include upper and lower guide rails 56, 58 for seating and guiding the upper and lower portions 60, 62 of the conveyor belts 12. The upper guide rails 56 each have a notch 64 for receiving link pins 66 of the upper portion 60 of the belts; and have a lower protrusion 70 for seating chain links 68 of the upper portion 60 of the belts. The lower guide rails 58 each have a notch 65 for receiving link pins 66 of the lower portion 62 of the belts; and have a lower protrusion 71 for seating chain links 68 of the lower portion 62 of the belts. The guide rails 56, 58 are preferably made from a hard plastic material having low friction surfaces to allow the chain links and link pins to slide freely therealong.

Each support structure 40, 42 also includes an extruded aluminum beam 74 extending substantially the length of the conveyor system for mounting the upper and lower guide rails 56, 58 thereupon. Mounted to each beam 74 is a metal shroud 76, and mounted on the inner surface 75 of each beam is a metal support plate 78. The shrouds 76 preferably extend the entire length of the beams and extend over the top of the upper guide rails 56 and upper portions 60 of the belts. The shrouds 76 are provided as a shield to protect the conveyor operator from the moving belts. The shrouds also have rounded corners to provide additional strength to the beams 74, and help prevent bowing, twisting or bending of the beams and guide rails 56, 58.

The support plates 78 also preferably extend the entire length of the beams 74. The support plates 78 provide vertical support for the buckets 14 as the buckets slide upon upper surfaces 79 of the support plates. The combination of the notches 64 in the upper guide rails 56 and the support plates 78 keep the buckets from tipping and thus alleviate any need for double-wide chains. The support plates 78 also provide rigidity to the beams 74 to help prevent bowing, twisting or bending of the beams and guide rails 56, 58. The support plates 78 may be removed when conveying lighter workpieces.

The stationary and mobile support columns 44, 46 each have mounting plates 80 for bolting the beams 74 thereto. The stationary support column 44 has a base 82 which is bolted directly to the platform 48. The mobile support columns 46, on the other hand, each have a pinion gear 84 rotatably mounted on a lower portion of the support column. Each pinion gear 84 rides on and is engaged with a rack 86 which is bolted to the platform 48.

As shown in FIGS. 2, 3 and 5, a shaft 88 extends through the hubs 90 of each pinion gear 84. Each pinion 84 includes a key 94 engaged with a key slot 92 in the shaft 88, to ensure that each pinion rotates in unison as the mobile support column 46 translates laterally back and forth. The shaft 88 is coupled to an annular bushing 96 which is journaled by bearings 98 that facilitate rotation of the shaft within the mobile support columns 46. Although the present embodiment utilizes a single shaft extending through and coupled to each of the pinion gears, it is within the scope of the invention to utilize any conventional means to couple pinion gears together and ensure that all, or at least two of the pinion gears, rotate in unison. For example, a single shaft can be coupled between two adjacent pinion gears, or a plurality of such shafts can be coupled between every adjacent pair of pinion gears.

It is also within the scope of the invention to mount racks to the underside of each of the mobile support columns 46, in place of the pinions 84, where the racks engage with laterally stationary pinions rotatably mounted onto the platforms 48, in place of the racks 86; and where each of the laterally stationary pinions are coupled together such that each of the pinions rotate in unison, thus assuring that each of the racks and attached mobile support columns translate laterally in unison.

Figure 6:
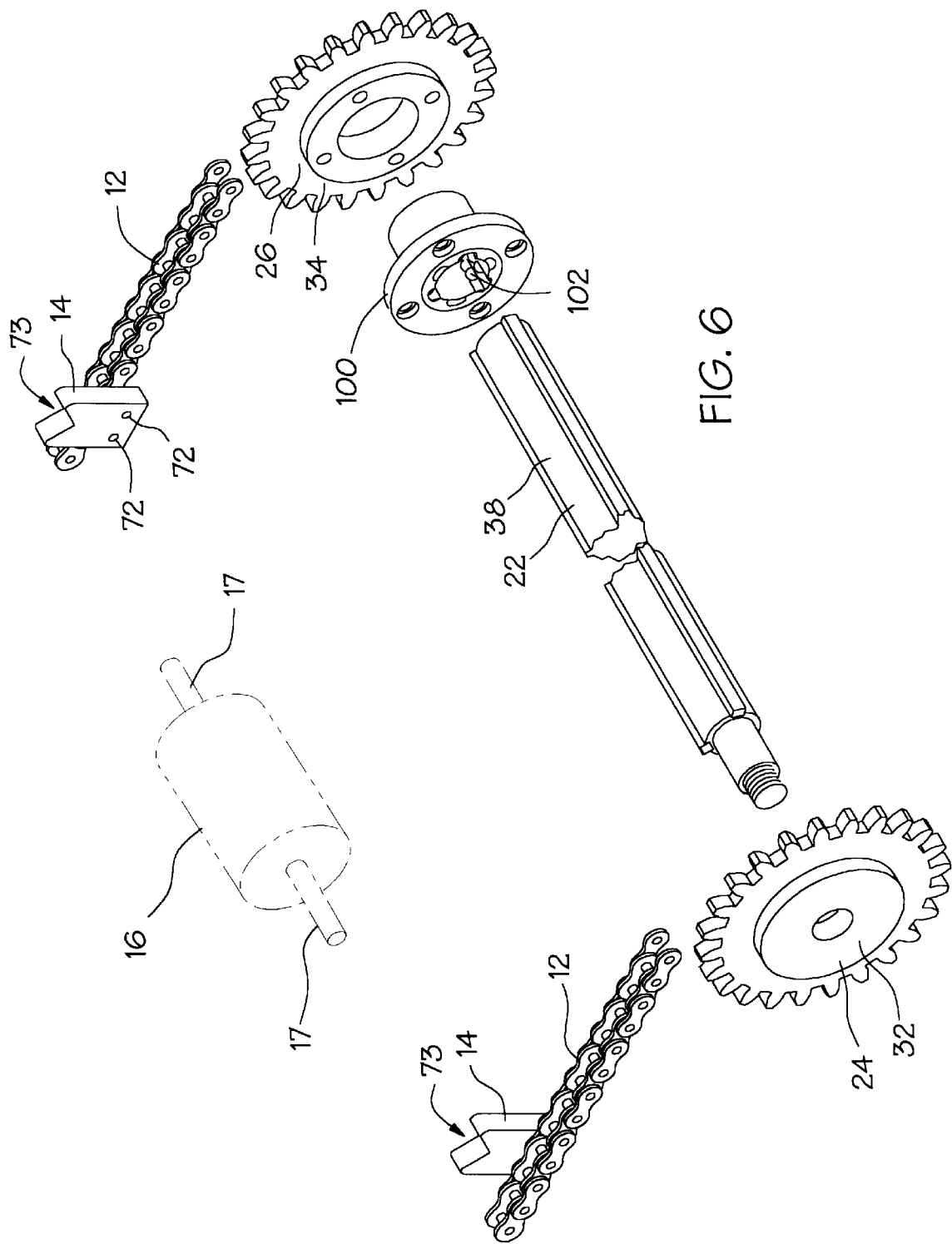
FIG. 6 is perspective exploded view of the ball spline and sprocket mechanisms for use with the present invention.

As shown in FIG. 6, the slidable sprocket wheels 26, 34 are each bolted to a spline nut 100 having bearings 102 for facilitating easy sliding of the mobile sprocket wheels along the spline shafts 22, 38. Such spline shaft and spline nut assemblies are commercially available through THK Co., Ltd. 3-6-4, Kami-Osaki, Shinagawa-Ku, Tokyo 141, Japan.

The buckets 14 have two bores 72 for receiving two adjacent link pins 66. Each bucket 14 has a longitudinally aligned partner bucket mounted on the opposing belt such that the work pieces 16 can extend between the pair of longitudinally aligned buckets. In the present embodiment, the buckets 14 have v-shaped grooves 73 on their upper surfaces for seating a cylindrical extension from the workpiece 16, such as a rotor shaft 17 extending through a D.C. motor rotor assembly.

To adjust the width between the parallel buckets 14 to match the width of a certain workpiece 16, the conveyor system operator only needs use his or her hand pressure to translate the laterally mobile support structure 42 laterally in or out depending upon the width of the new workpiece. Because the pinion gears 84 will all rotate in unison, and because sufficient rigidity has been added to the beam 74 by the shroud 76 and support plate 78, the mobile support structure 42 will maintain its parallel relationship with the stationary support structure 40, along the entire length of the support structures 40, 42, throughout the lateral translation of the mobile support structure 42. Therefore, none of the spline nuts 100 will be caused to tilt with respect to their respective spline shafts 22, 38, allowing the spline nuts 100, and in turn, the mobile longitudinal support structure 42 to translate laterally without any binding or catching.

Having described the invention in detail and by reference to the drawings, it will be apparent that modification and variations are possible without departing from the scope of the invention as defined in the following claims.

What is claimed is:

1. A conveyor system, comprising:
   a conveyor for longitudinally conveying a workpiece;
   two parallel guide rails longitudinally supporting said conveyor;
   at least one fixed support supporting one of said guide rails;
   a plurality of laterally mobile supports supporting the other of said guide rails; and
   a positioning system for longitudinally aligning said laterally mobile supports throughout lateral movement of said laterally mobile supports;
   said positioning system including a plurality of pinion gears, each of said pinion gears being rotatable mounted to a respective one of said laterally mobile supports and fully supporting said laterally mobile support;
   each of said pinion gears engaging a laterally fixed rack.

2. The conveyor system of claim 1, wherein said pinion gears are coupled together such that said pinion gears rotate in unison.

3. The conveyor system of claim 2, wherein said positioning system further comprises a shaft extending between, and coupled to, at least two of said pinion gears.

4. The conveyor system of claim 2, wherein said positioning system further comprises a shaft extending through, and fixed to the hubs of said pinion gears.

5. The conveyor system of claim 4, wherein rack is mounted on a laterally fixed standing assembly.

6. The conveyor system of claim 5, further comprising:
   a drive shaft; and
   a first wheel and a second wheel, coupled to said drive shaft, for driving said conveyor;
   said second wheel being laterally slidable with respect to said first wheel.

7. The conveyor system of claim 6, wherein said drive shaft is a spline shaft, and said second wheel is coupled to a spline nut slidably mounted on said spline shaft.

8. The conveyor system of claim 1, further comprising:
   a drive shaft; and
   a first wheel and a second wheel, coupled to said drive shaft, for driving said conveyor;
   said second wheel being laterally slidable with respect to said first wheel.

9. A conveyor system, comprising:
   two parallel beams;
   two parallel guide rails longitudinally mounted on said beams;
   two parallel belts, riding in and guided by said rails, for longitudinally conveying a plurality of buckets, fixed to said belts;
   at least one fixed support for supporting one of said beams; and
   a plurality of laterally mobile supports for supporting the other of said beams, each of said mobile supports including a pinion gear rotatably mounted thereto for fully supporting said mobile support, each of said pinion gears being engaged with a laterally fixed rack, said pinion gears being coupled together such that said pinion gears rotate in unison.

10. The conveyor system of claim 9, further comprising:
    a drive shaft;
    a first wheel, laterally fixed to said drive shaft, for driving one of said belts; and
    a second wheel, slidably mounted on drive shaft, for driving the other one of said belts.

11. The conveyor system of claim 10, wherein said drive shaft is a spline shaft, and said second wheel is coupled to a spline nut slidably mounted on said spline shaft.

12. The conveyor system of claim 11, wherein said belts are chains and said first and second wheels are sprocket wheels.

13. The conveyor system of claim 9, wherein each of said beams include a support plate, longitudinally mounted therealong for substantially preventing distortion or bending of said beams.

14. The conveyor system of claim 13, wherein said support plates provide vertical support for said buckets.

15. A conveyor system, comprising:
    a first guide rail;
    a second guide rail, parallel to said first guide rail;
    a conveyor, guided by said guide rails, for longitudinally conveying a plurality of buckets;
    a plurality of support members, supporting said first guide rail, each of said support members being laterally mobile such that said first guide rail is laterally adjustable with respect to said second guide rail; and
    a positioning system maintaining longitudinal alignment of said support members;
    said positioning system including a plurality of pinion gears, each of said pinion gears being rotatably mounted to a respective one of said support members and fully supporting said support member;
    each of said pinion gears engaging a laterally fixed rack.

16. The conveyor system of claim 15, wherein said aligning means includes a shaft extending between, and coupled to, at least two of said pinion gears.

* * * * *